US011316949B2

(12) United States Patent
Baer et al.

(10) Patent No.: US 11,316,949 B2
(45) Date of Patent: Apr. 26, 2022

(54) ACCESS MANAGEMENT TO USER RELATED DATA

(71) Applicant: Telia Company AB, Solna (SE)

(72) Inventors: Anders Baer, Årsta (SE); Maria Jernström, Vega (SE)

(73) Assignee: TELIA COMPANY AB, Solna (SE)

( * ) Notice: Subject to any disclaimer, the term of this patent is extended or adjusted under 35 U.S.C. 154(b) by 0 days.

(21) Appl. No.: 16/710,220

(22) Filed: Dec. 11, 2019

(65) Prior Publication Data
US 2020/0195749 A1 Jun. 18, 2020

(30) Foreign Application Priority Data

Dec. 12, 2018 (FI) ...................................... 20186072

(51) Int. Cl.
H04L 29/08 (2006.01)
H04L 29/06 (2006.01)
G06F 16/00 (2019.01)
H04L 67/306 (2022.01)
H04L 67/53 (2022.01)
H04L 67/50 (2022.01)

(52) U.S. Cl.
CPC ............ H04L 67/306 (2013.01); H04L 67/20 (2013.01); H04L 67/22 (2013.01)

(58) Field of Classification Search
CPC ....... H04L 67/306; H04L 67/22; H04L 67/20; H04L 29/08
See application file for complete search history.

(56) References Cited

U.S. PATENT DOCUMENTS

| 9,015,236 | B1 * | 4/2015 | Fredinburg | G06F 16/957 709/203 |
| 9,785,495 | B1 * | 10/2017 | Lazier | G06F 11/0709 |
| 9,928,379 | B1 * | 3/2018 | Hoffer | G16H 40/67 |
| 10,503,923 | B1 * | 12/2019 | Gupta | G06F 21/6218 |
| 2003/0084302 | A1 * | 5/2003 | de Jong | G06F 21/6245 713/185 |
| 2004/0117370 | A1 * | 6/2004 | Dutta | G06Q 10/10 |
| 2005/0234969 | A1 | 10/2005 | Mamou et al. | |

(Continued)

FOREIGN PATENT DOCUMENTS

| EP | 2 020 796 | 2/2009 |
| EP | 3 190 517 | 7/2017 |

(Continued)

OTHER PUBLICATIONS

Finnish search report, 20186072, dated May 23, 2019.
European Search Report issued in European Patent Application No. EP 19 21 4359 dated Jan. 31, 2020.

Primary Examiner — Christopher B Robinson
(74) Attorney, Agent, or Firm — Nixon & Vanderhye

(57) ABSTRACT

Disclosed is a method for managing user related data by an access server, the method includes: receiving a request of a user related data; determining data storage storing the user related data; generating an inquiry to the determined data storage for receiving the user related data; in response to a detection that the data storage is granted a right to provide the user related data to the access server receiving the user related data; and generating a response to the system of the service provider, the response including the user related data. Also disclosed is an access server and a computer program product.

9 Claims, 3 Drawing Sheets

(56) References Cited

U.S. PATENT DOCUMENTS

| | | | | |
|---|---|---|---|---|
| 2009/0282458 A1* | 11/2009 | Hjelm | ............... | H04L 67/303 |
| | | | | 726/1 |
| 2010/0010999 A1* | 1/2010 | Gerovac | ............... | G06F 9/5011 |
| | | | | 707/E17.005 |
| 2011/0060771 A1* | 3/2011 | Llorente | ........... | H04L 29/12132 |
| | | | | 707/812 |
| 2016/0006705 A1* | 1/2016 | Gupta | ................ | G06F 21/6227 |
| | | | | 713/168 |
| 2016/0036822 A1* | 2/2016 | Kim | ................... | H04L 67/1097 |
| | | | | 726/4 |
| 2018/0255030 A1* | 9/2018 | Gupta | ................. | H04L 9/3213 |

FOREIGN PATENT DOCUMENTS

| | | | | |
|---|---|---|---|---|
| EP | 3190517 A1 * | 7/2017 | ............ | G06F 9/541 |
| WO | WO 2014/101240 | 7/2014 | | |

\* cited by examiner

ACCESS MANAGEMENT TO USER RELATED DATA

TECHNICAL FIELD

The invention concerns in general the technical field of communications. More particularly, the invention concerns an access management to services in networks.

BACKGROUND

Different kinds of data relating to a user is transferred and stored in communication networks. However, at the same time users are more and more unaware of which data relating to them is stored in which data storage. This kind of issues has gained even more importance lately since a legislation relating to personal and privacy data has been tightened.

In broad terms a digitalized world is based on servers and databases arranged to store different kinds of data. The data may be utilized by services implemented by one or more servers, which services are available over the communication networks. Hence, the servers implementing the service may be granted an access to the data, such as user related data. However, the user himself/herself may not be aware of all the data and its utilization in the prior art solutions.

Hence, there is need to introduce new solutions for mitigating at least in part of the drawbacks of the prior art solutions and which solutions improve user's capability of managing data relating to him/her.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a method, an access server and a computer program product for managing user related data.

The objectives of the invention are reached by a method, an access server and a computer program product as defined by the respective independent claims.

According to a first aspect, a method for managing user related data by an access server is provided, the method comprises: receiving, from a system of a service provider, a request of a user related data; determining, from data carried in the request, data storage storing the user related data; generating an inquiry, by the access server, to the determined data storage for receiving the user related data; in response to a detection that the data storage is granted a right to provide the user related data to the access server receiving the user related data; and generating a response to the system of the service provider, the response comprising the user related data.

The data used for determining the data storage storing the user related data as requested may be an identifier of the user.

The identifier of the user may be carried in the inquiry generated to the determined data storage. The inquiry may further comprise information representing a service requesting the user related data.

According to a second aspect, an access server for managing user related data is provided, the access server comprises: at least one processor; at least one memory including computer program code; the at least one memory and the computer program code configured to, with the at least one processor, cause the access server to perform: receive, from a system of a service provider, a request of a user related data; determine, from data carried in the request, data storage storing the user related data; generate an inquiry to the determined data storage for receiving the user related data; in response to a detection that the data storage is granted a right to provide the user related data to the access server receive the user related data; and generate a response to the system of the service provider, the response comprising the user related data.

The access server may be arranged to use an identifier of the user as the data for determining the data storage storing the user related data as requested.

Further, the access server may be arranged to include the identifier of the user in the inquiry generated to the determined data storage. The access server may further be arranged to include information representing a service requesting the user related data in the inquiry.

According to a third aspect, a computer program product for managing user related data is provided which, when executed by at least one processor, cause a server device to perform the method as described above.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
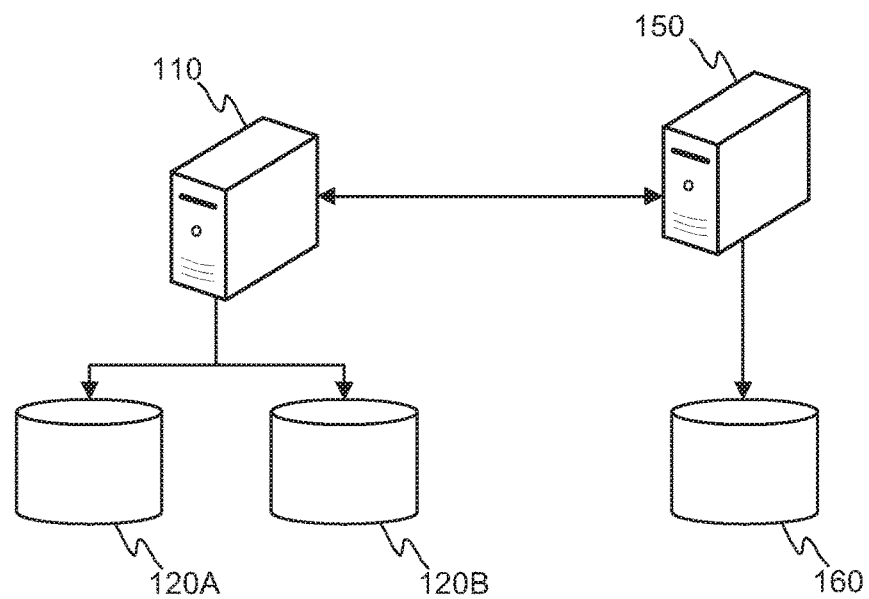
FIG. 1 illustrates schematically a communication system according to an embodiment of the invention.

FIG. 1 illustrates schematically a communication system according to an embodiment of the invention. The communication system may comprise one or more access servers 110, 150 configured to maintain at least some user data within a domain they belong to. The domain may e.g. refer to a part of a network distinguished from other parts with network addressing. Thus, the domain may correspond to a section of the communication network, for example. The access servers 110, 150 may be communicatively coupled to one or more data storages 120A, 120B, 160 which may be arranged to store user related data. An implementation of the present invention may e.g. be that an access server 110 may be arranged to manage data related to one or more first users whereas another access server 150 may be arranged to manage data related to one or more second users. It may also be arranged that a plurality of access servers 110, 150 e.g. in different domains may be arranged to store user related data of a certain user. Moreover, it may be arranged that a first data storage 120A may be arranged to store first type of user related data with respect to a user managed by the access server 110 and a second data storage 120B may be arranged to store second type of user related data with respect to the same user managed by the access server 110. For the purpose of enabling a retrieval of user related data from the data storages 120A, 120B, 160 the access servers 110, 150 may be arranged to store, or at least to access to, data enabling a determination of a user in response to a receipt of a request of user related data. The data may be such which may be used for comparing of the data carried in the request with the stored data. The data may e.g. be a unique identifier representing the user, or a terminal device of the user, such as a system generated identifier or a personal identity number or similar. Moreover, the access servers 110, 150 may be arranged to store data providing information what kind of user related data is stored in each data storage 120A, 120B, 160. Still further, the access servers 110, 150 may store data linking the access servers 110, 150 together in one way or another, such as the data may provide information what kind of data, such as user related data, is accessible through a certain access server 110, 150.

According to some embodiments of the invention the data storages 120A, 120B, 160 may be arranged to store data which defines a number of services allowed to access the user related data they store. For example, data structure in the first data storage 120A storing the first type of user related data may be implemented so that it further defines services, which may access the first type of user related data stored in the data storage. The definition of services allowed to access data may be based a pre-agreed identifier representing the service in question which may be carried to the data storage in an inquiry and in that manner, it may be determined if the service in question may access the data the data storage in question is storing.

According to at least some embodiments of the present invention the data stored in the data storages 120A, 120B, 160 being accessible through one or more access servers 110, 150 may be user manageable. This refers to an implementation in that a user may access to the stored data relating to him/her and modify the data. The data modifiable by the user may e.g. be the data indicating the services allowed to access the data or it may also be user related data itself. The access to the data in question may be implemented so that the access server 110, 150 is arranged to prompt user credentials in response to a request transmitted to the access server 110, 150 by the user with his/her terminal device. Hence, the user inputs the requested credentials and if they match the user may be granted an access to the data stored in the data storages 120A, 120B, 160. In other words, the access server 110, 150 may be arranged to determine if the user credentials match with the legitimate credentials and if the match is found it may establish a connection to the user data stored in one or more data storages 120A, 120B, 160. Alternatively, it may be arranged that the access server 110, 150 retrieves the stored user related data from one or more data storages 120A, 120B, 160 and establishes a session, e.g. a virtual machine type session, for receiving the modifications desired by the users to the data relating to him/her. After the modification session is over, the access server 110, 150 may be arranged to store at least the modified data to the corresponding data storage 120A, 120B, 160.

In addition to the above described capability of modifying the user related data by the user it may be arranged, according to an embodiment of the invention, that the user may define a time related characteristic to the data stored in the at least one data storage 120A, 120B, 160. The time related characteristic may e.g. represent a time value, such as a period of time, when the data may be accessible to a third party, such as an entity providing a service needing the user related data. The described feature may e.g. be implemented so that the data storage 120A, 120B, 160 may be arranged to, in response to a receipt of a request of the user related data, determine, e.g. in response to a positive outcome of access right determination, if there are time constraints set for accessing the user related data in question. If there is, the data storage 120A, 120B, 160 may be arranged to determine a time of the request and compare it to the time constraints. Depending on an outcome of the comparison, either access to the user related data may be granted or the access may be denied.

According to another embodiment of the invention the data storage may be arranged to store a definition, i.e. a characteristic of the user related data, which indicates that a permission for accessing the user related data in question shall be requested from the user. The parameter may be user modifiable. The permission parameter provides a way to control the access to the user related data in a sophisticated way especially because the user may store user related data in the system according to the present invention so that access to the data is always under control of the user. It may be arranged that the request transmitted to the user comprises further data, such as information on the party requesting the access to the data, for example.

Figure 2:
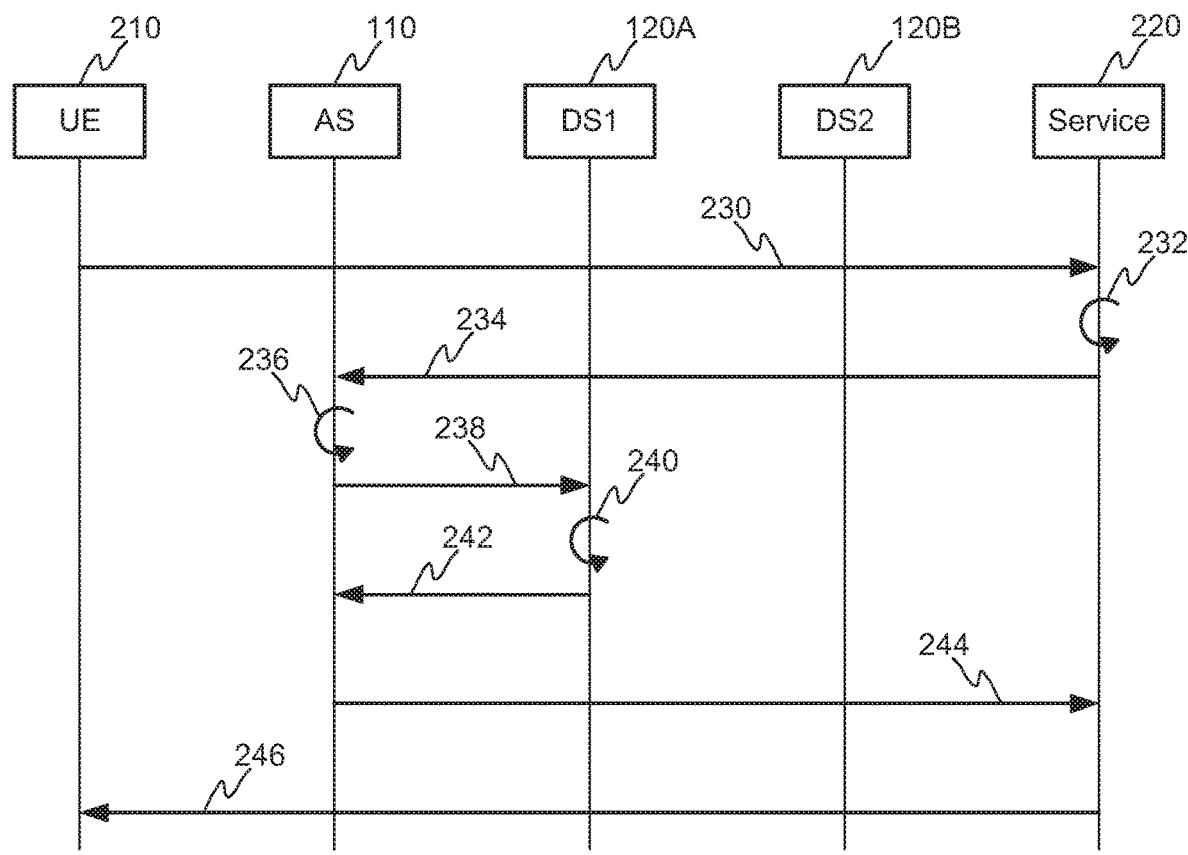
FIG. 2 illustrates schematically a signal flow diagram according to an embodiment of the invention.

Next, at least some aspects of the present invention are discussed by referring to FIG. 2. FIG. 2 schematically illustrates a signal flow diagram in an environment in which an access server 110 is managing an access to user related data stored at least in data storages 120A, 120B. In the example a user by using his/her terminal device 210, such as a mobile phone or a tablet device or similar, initiates a service request 230 to a system 220 of a service provider. The system 220 may in this context refer to a standalone device, such as a server device, or a distributed service architecture. In response to a receipt of the service request 230 the system 220 may be arranged to identify the user, or the terminal device 210, from an identifier carried in the service request 230. Additionally, the request may carry information indicating an access server 110, 150 or an identifier of data needed in the requested service by means of which the access server 110, 150 may be determined. Hence, in a phase 232 the system 220 of the service provider may determine at least one piece of data from the request by means of which it may determine an identifier of the user and, hence, an access server 110, 150 managing an access to data needed for implementing the service.

Next, the system 220 may be arranged to generate a request 234 of user related data to the determined access server 110, 150. The request may e.g. carry an identifier of the user, or any other data indicating which data is requested from the determined access server 110, 150. In phase 236 the access server 110, 150 may be arranged to determine the data storage 120A, 120B storing the requested data and generate an inquiry 238 towards the determined data storage 120A. The inquiry 238 may carry data representing an identifier of the user, or any other data indicating which data is inquired from the data storage 120A. The data storage 120A may perform access right related tasks as described, such as determining if the access server in question, or especially the service requesting the user related data is granted a right to access the user related data 240. Hence, it may be arranged that the inquiry carries information representing the access server requesting the data or the service, or the system 220 implementing the service, or both with the identifier of the user. The data storage 120A may be arranged to generate a response 242 to the access server 110. According to an embodiment of the invention the response 242 may carry at least part of the user related data stored in the data storage 120A in question. The access server 110 may be arranged to generate a response 244 to the system 220 of the service provider. The response 244 may carry the requested user related data. As a result of the described signal flow the system 220 may possess the required information for providing the requested service to the terminal device 210. The signal 246 may describe a provision of the service to the terminal device 210 by the system 220 or a provision of an acknowledgement to the terminal device 210 for indicating that the terminal device 210 may now provide the service.

Figure 3:
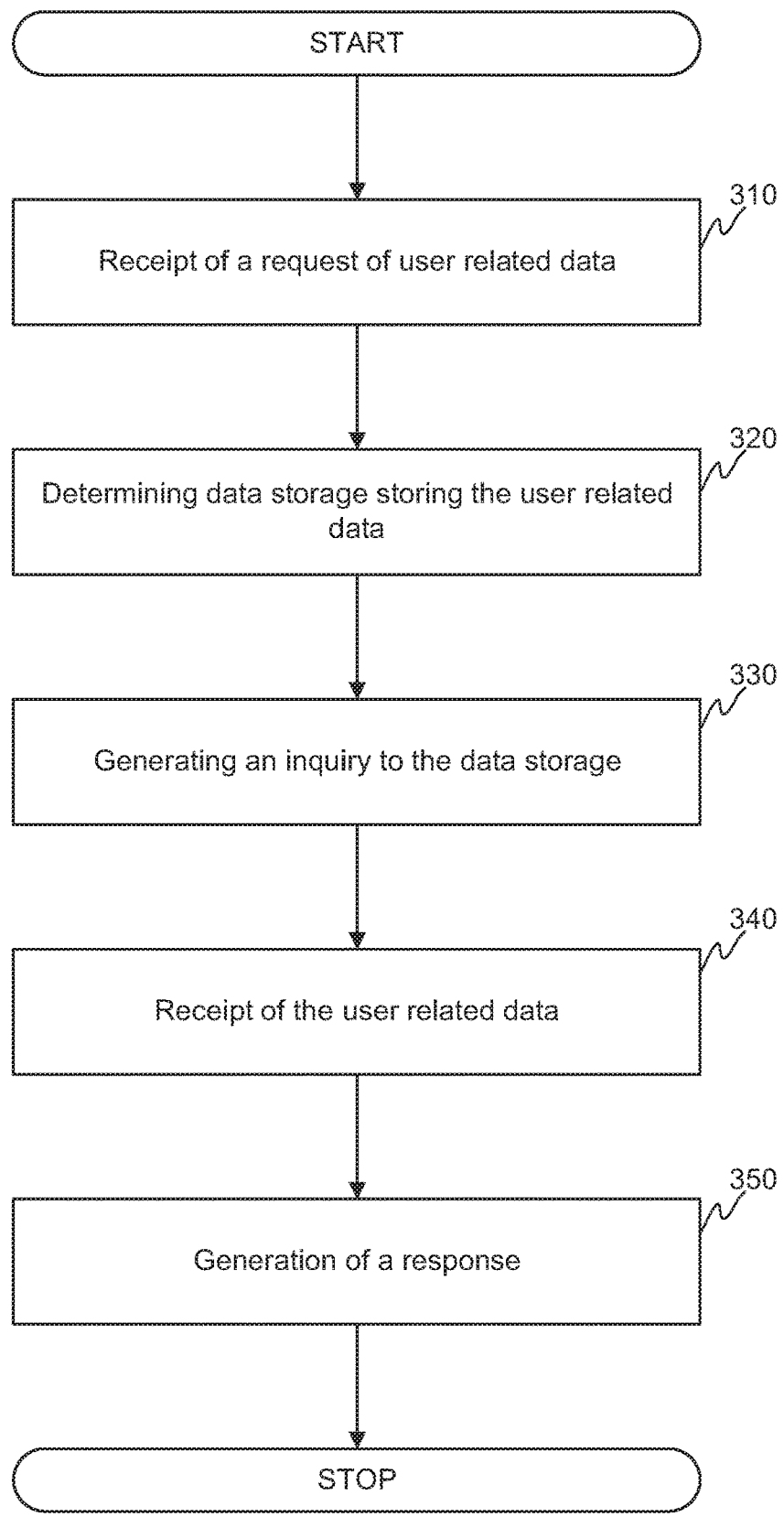
FIG. 3 illustrates schematically a method according to an embodiment of the invention.

In FIG. 3 it is schematically illustrated an example of a method according to an embodiment of the invention from a perspective of an access server 110, 150. First, in step 310, the access server 110, 150 in question may receive a request 234 of user related data. The request 234 may e.g. carry an identifier of the user, or any other data indicating which data is requested from the determined access server 110, 150. Next, the access server 110, 150 may be arranged to determine 320 data storage 120A, 120B, 160 storing the requested data (this corresponds at least in part the phase 236 in FIG. 2). In response to the determination of the data storage 120A, 120B, 160 an inquiry 238 may be generated 330 towards the determined data storage 120A, 120B, 160 in the manner as described. The data storage 120A, 120B, 160 may be arranged to perform operations which causes retrieval of the requested user related data by the data storage 120A, 120B, 160 if the requester is entitled to access the data in question and/or other constraints, such as time related constraints, are fulfilled. The data storage 120A, 120B, 160 may be arranged to transmit the requested user related data and it is received 340 by the access server 110, 150. The access server 110, 150 may be arranged to generate 350 a response 244 to the system of the service provider which originally requested the user related data.

Figure 4:
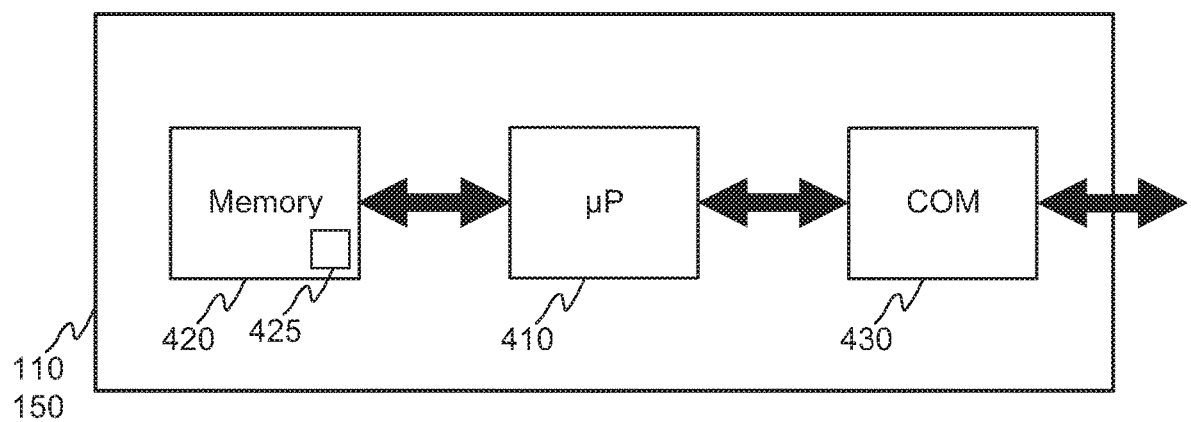
FIG. 4 illustrates schematically an access server according to an embodiment of the invention.

FIG. 4 schematically illustrates an example of an access server device 110, 150 arranged to perform a management of the user related data in the manner as described. The access server 110, 150, when implemented as a standalone device, may comprise a processing unit 410 comprising one or more processors, a memory unit 420 comprising one or more memory devices and a communication interface 430 comprising one or more communication devices, such as one or more modems, one or more data buses and/or one or more other devices. Advantageously, the memory unit 420 may store portions of computer program code 425 and any other data, and the processing unit 410 may cause the access server 110, 150 to operate as described by executing at least some portions of the computer program code stored in the memory unit 420. For sake of clarity it is worthwhile to mention that the physical implementation of the access server 110, 150 may be centralized or distributed.

At least some aspects of the present invention may relate to a processor-readable non-transitory storage medium on which is stored one or more sets of processor executable instructions, e.g. in a form of portions of computer program code 425, configured to implement one or more of steps of the method as described. The instructions may also reside, completely or in part, within a main memory, the static memory, and/or within the processor during execution thereof by the at terminal device in question. The term computer-readable medium shall also cover, but is not limited to, solid-state memories such as a memory card or other package that houses one or more read-only (non-volatile) memories, random access memories, or other re-writable (volatile) memories; magneto-optical or optical medium such as a disk or tape; as well as carrier wave signals such as a signal embodying computer instructions in a transmission medium; and/or a digital file attachment to e-mail or other information archive or set of archives considered to be a distribution medium equivalent to a tangible storage medium.

In the description of the present invention it is introduced the data storages 120A, 120B, 160 as entities belonging to the communication system as described. The data storages 120A, 120B, 160 may be devices which are arranged to perform operations as described. Hence, the data storages 120A, 120B, 160 may comprise processing unit, memory unit and any other entities enabling the operations as described.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for managing user related data by an access server, the method comprising:
receiving at the access server, from a system of a service provider, a request for a user related data;
determining at the access server, from data carried in the request, a data storage that stores the user related data based on an identifier of the user,
said identifier derivable from the data carried in the request, and the data storage being a network device of a plurality of network devices residing in a communication network;
generating an inquiry, by the access server, to the determined data storage for receiving the user related data;
responsive to a detection that the data storage is granted a right to provide the user related data to the access server, receiving the user related data at the access server; and
generating a response to the system of the service provider, the response comprising the user related data.

2. The method of claim 1, wherein the identifier of the user is carried in the inquiry generated to the determined data storage.

3. The method of the claim 2, wherein the inquiry further comprises information representing a service requesting the user related data.

4. An access server for managing user related data, comprising:
- at least one processor;
- at least one non-transitory memory with computer program code stored therein;
- the computer program code configured to, upon execution by the at least one processor, cause the access server to:
  - receive, from a system of a service provider, a request for a user related data,
  - determine, from data carried in the request, a data storage that stores the user related data based on an identifier of the user, the identifier of the user derivable from the data carried in the request, and the data storage being a network device of a plurality of network devices residing in a communication network,
  - generate an inquiry to the determined data storage for receiving the user related data,
  - responsive to a detection that the data storage is granted a right to provide the user related data to the access server, receive the user related data, and
  - generate a response to the system of the service provider, the response comprising the user related data.

5. The access server of claim 4, wherein the access server is arranged to include the identifier of the user in the inquiry generated to the determined data storage.

6. The access server of claim 5, wherein the access server is further arranged to include information representing a service requesting the user related data in the inquiry.

7. A non-transitory computer-readable medium on which is stored a computer program for managing user related data which, when executed by at least one processor, cause a server device to perform the method according to claim 1.

8. A non-transitory computer-readable medium on which is stored a computer program for managing user related data which, when executed by at least one processor, cause a server device to perform the method according to claim 2.

9. A non-transitory computer-readable medium on which is stored a computer program for managing user related data which, when executed by at least one processor, cause a server device to perform the method according to claim 3.

* * * * *